Dec. 11, 1945.   N. H. ANDREWS   2,390,678
METHOD AND APPARATUS FOR REFINING DRY MATERIALS
Original Filed July 31, 1940    2 Sheets-Sheet 1
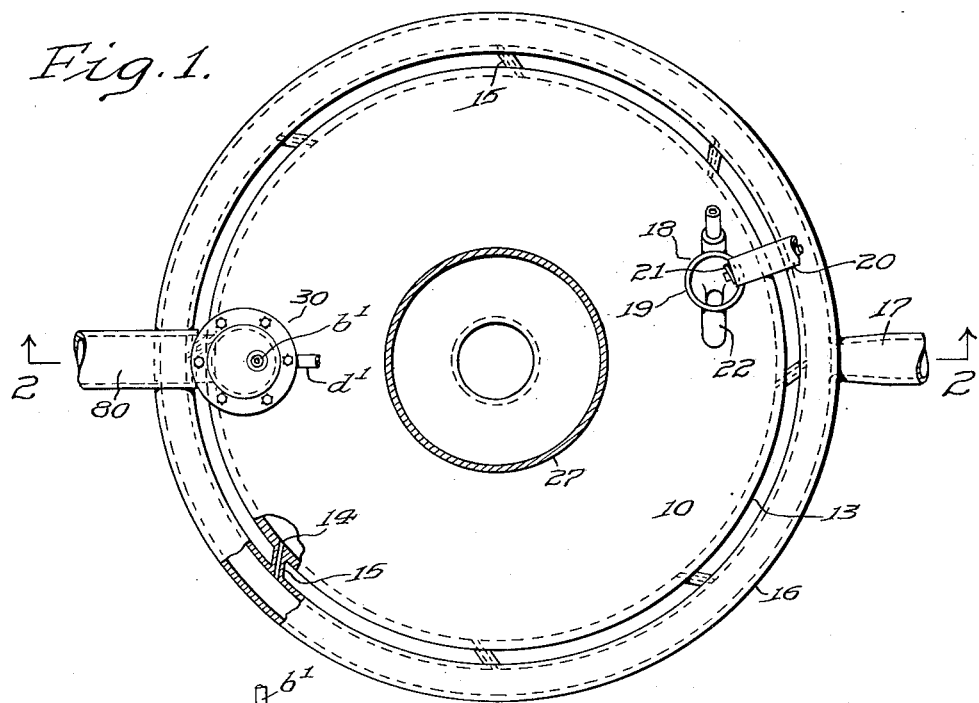
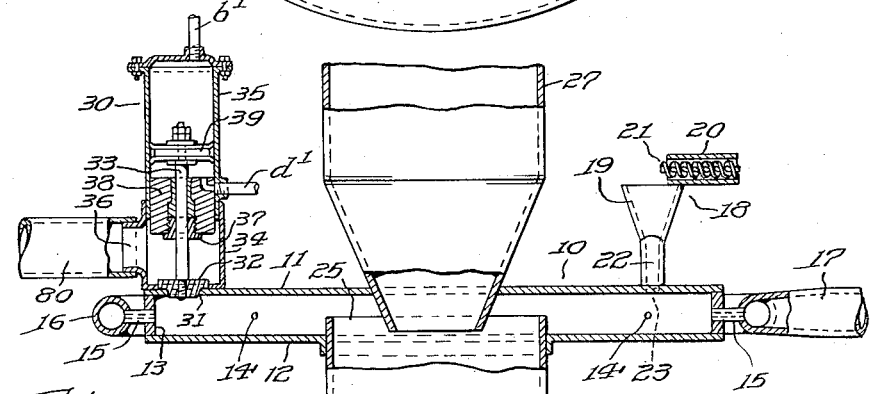
WITNESS
F. J. Hartman
INVENTOR
Norwood H. Andrews
BY John D. Myers
ATTORNEY Dec. 11, 1945.   N. H. ANDREWS   2,390,678
METHOD AND APPARATUS FOR REFINING DRY MATERIALS
Original Filed July 31, 1940   2 Sheets-Sheet 2
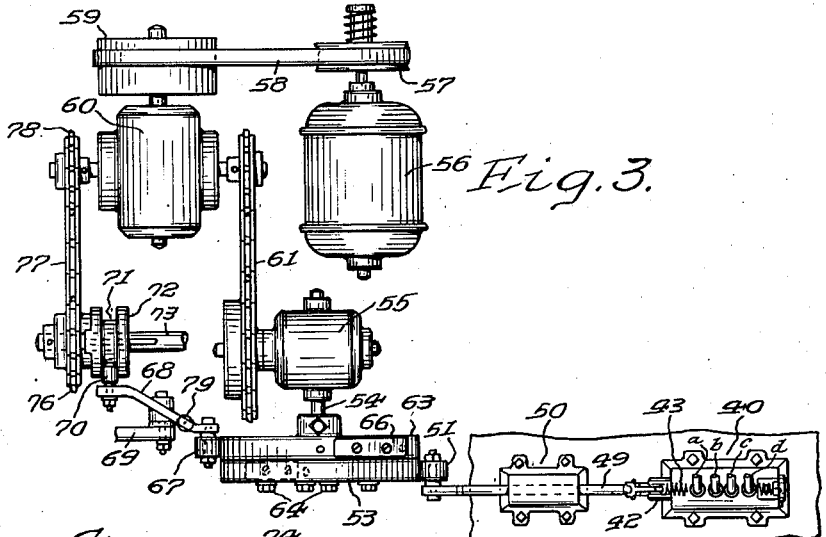
Fig. 3.
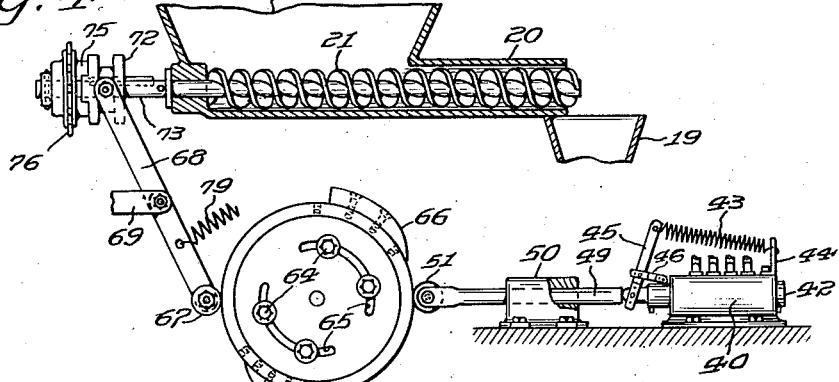
Fig. 4.
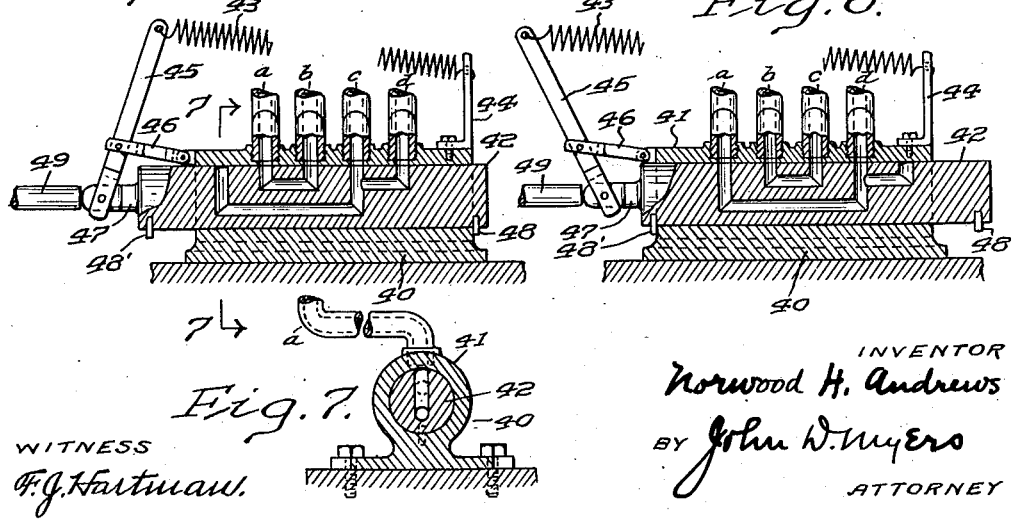
Fig. 5.   Fig. 6.
Fig. 7.
WITNESS
F. J. Hartman.
INVENTOR
Norwood H. Andrews
BY John W. Myers
ATTORNEY Patented Dec. 11, 1945

2,390,678

UNITED STATES PATENT OFFICE 2,390,678

METHOD AND APPARATUS FOR REFINING DRY MATERIALS

Norwood H. Andrews, Moorestown, N. J., assignor to International Pulverizing Corporation, a corporation of New Jersey Continuation of application Serial No. 348,733, July 31, 1940. This application April 25, 1942, Serial No. 440,480

4 Claims. (Cl. 241—5)

The invention relates to a method and apparatus for refining dry materials, and is particularly applicable to the pulverization and refining of solid substances composed of materials which differ in friability, or to the separation or refining of solid materials composed, in part, of pulverulent particles and, in part, of relatively non-pulverulent particles or particles which, in comparison with the particles reducible to a powder, are less friable and are therefore relatively difficult to pulverize.

In the pulverization of many solid materials it is frequently desirable to discontinue the operation when the materials have been reduced to such an extent as to convert the more friable particles into a pulverous condition while the less friable particles remain in a relatively non-pulverous condition, and then discharge the relatively non-pulverous particles from the pulverizing apparatus. Such relatively non-pulverulent substances, in the case of many materials, constitute impurities in the pulverulent material, and it is desirable to separate such impurities before the particles thereof are reduced to a pulverous condition.

Certain types of clay, for example, are very useful for enameling purposes, but they have been found to contain deleterious quantities of impurities, such as free silica and pyrites. Although they may have a particle size as small as 325 mesh, it is desirable to remove these impurities from the clay. The available methods and apparatus for refining such clay have not been entirely satisfactory. Certain iron oxides, useful as pigments and other purposes, and containing undesirable impurities such as silica, are improved by refining in such a manner as to remove the silica. The method and apparatus of the present invention have been developed for and are useful in refining enameling clay containing free silica and pyrites, in freeing silica from iron oxides, and in refining other materials composed of substances differing in friability.

The present invention therefore has for one of its objects the refining of materials, in finely divided, dry form, by the removal from materials in pulverous condition of the substances which are relatively difficult to pulverize in comparison with the substances which are readily pulverulent. A further object of the invention is the provision of a method and apparatus for removing impurities from solid materials so as to improve the quality of the desired, finely divided, dry product. A still further object of the invention is the provision of a method and apparatus for pulverizing and refining solid materials in such a manner as to reduce to a pulverous state the substances which are readily pulverizable, and to remove therefrom those substances which, in comparison therewith, are relatively difficult to pulverize. An additional object is the provision of a method and an apparatus for discharging from a gaseous vortex the circulating load of material, relatively non-pulverous as compared with the pulverous material entrained by the inwardly moving vertical flow, or for discharging from the vortex a circulating load of granular material within a relatively high specific gravity range as compared with the material entrained by the inwardly moving vorticle flow.

Other objects, advantages and uses of the invention will be apparent from the description which follows, taken with the accompanying drawings showing apparatus designed for the practice of the invention.

Fig. 1 of the drawings is a plan view of one form of reducing and refining chamber used with the invention, together with the feeding means and discharge device associated therewith;

Fig. 2 is a transverse sectional view, partly in elevation, taken on the line 2—2 of Fig. 1;

Fig. 3 is a plan view of the control mechanism for the feeding means and the discharge device;

Fig. 4 is an end elevational view of part of the mechanism illustrated in Fig. 3, parts of the material feeing mechanism also being shown in section;

Fig. 5 is a longitudinal sectional view of the control valve for actuating the discharge device, the parts being shown in the position which they occupy when the discharge valve is closed;

Fig. 6 is a longitudinal sectional view similar to Fig. 5, the parts being shown in position which they occupy when the discharge valve is open; and Fig. 7 is a transverse sectional view of the control valve, taken on the line 7—7 of Fig. 5.

I have now found a method whereby the foregoing and other objects can be accomplished which includes: introducing a composition composed of pulverulent and relatively non-pulverulent solid material into an inclosed chamber; introducing a gas under pressure at high velocity into said inclosed chamber to suspend said composition in the gas, to subdivide said pulverulent solid, and to create a re-entrant circulatory path for solid particles larger than predetermined size ranges; exhausting from said chamber gas having entrained therein substantially only those solid particles which are below predetermined particle size ranges; and, periodically discharging gas and solid particles larger than predetermined size ranges from the periphery of said chamber.

The re-entrant circulatory path for solid particles larger than predetermined size ranges can be created and maintained in various forms of jet pulverization apparatus such as that described in United States Letters Patent 2,032,827. Another form of apparatus which may be employed in carrying out the present invention, with the addition of suitable elements as herein described in connection with Patent 2,032,827, is that described in United States Letters Patent 2,191,095 or 2,219,011. In either of these forms of jet pulverization apparatus a re-entrant circulatory path for particle travel is created and maintained by the introduction of high velocity jets of gas. The term "re-entrant circulatory path" as herein employed, is used to describe the line of flow of solid particles travelling in an inclosed zone or chamber in which solid particles above predetermined size ranges are retained in said zone by centrifugal force and are subjected to the action of high velocity jets of gas and in which the solid particles below predetermined size ranges may be continuously exhausted from the zone by entrainment in gas leaving the same.

One form of reducing apparatus with which the improvement may be utilized is illustrated in Figs. 1 and 2 of the drawings. While the structure of this reducing apparatus may be varied in many particulars, it preferably comprises a shallow cylindrical chamber 10 having an upper end wall 11, a lower end wall 12, and a peripheral wall 13. The wall 13 is provided with a plurality of spaced jet openings 14 arranged therein in such a manner as to inject a gaseous fluid such as air, steam, carbon dioxide, et cetera. into the chamber in a direction so as to establish and maintain a gaseous vortex therein. The openings 14 may be the outlet ends of nozzles 15, the inlet ends of which are connected to a header 16 to which fluid is supplied under pressure through supply pipe 17.

In order to supply material to the chamber 10 for the gaseous streams and the vortex maintained thereby to operate upon, there is provided feeding means 18 which, in the present instance, comprises a device of the injector type. This includes a small hopper 19 into which granular material may be delivered from a feed tube 20 by a feed screw 21 operated in the manner hereinafter described. The material supplied to the hopper 19 by the feed screw 21 is delivered to an injector 22 connected to the lower end of the hopper, whence it is discharged under slight pressure through an opening 23 in the wall 11 of the reducing chamber, directly into the gaseous vortex and preferably in the general direction of rotation of the vortex.

A centrally arranged opening in the wall 12 of the reducing chamber is provided with a separator or collector member 24, the inner end of which preferably terminates a slight distance inwardly of the wall 12 as indicated at 25. The outer end of the collector member 24 is preferably provided with a restricted opening 26 through which pulverized material, or material entrained by the inflow of the vortex, is discharged into a suitable receptacle. In the wall 11, opposite the collector opening in the wall 12, and preferably coaxial therewith, is a smaller outlet which opens into a discharge conduit 27 for fluid which has been freed of pulverous material in the collector 24. By providing the outlet to the discharge conduit 27 opposite the opening into the collector 24, the freed fluid may be withdrawn in an efficient manner and without disturbing the vortical movement in the collector 24.

While the structure and operation of such reducing apparatus is described in detail in Andrews Patent No. 2,032,827, granted March 3, 1936, and reference is made thereto for a more complete understanding, it is desired to point out that the high pressure of the fluid supplied to the header 16 results in the discharge of streams or jets of gaseous fluid at very high velocity through the openings 14 in the peripheral wall of the pulverizing chamber 10. These streams set up and maintain an inwardly spiralling vortex in the chamber 10, and at the same time cut across and through the outer portion of the vortex, so that particles of the solid material supplied to and circulating in the chamber 10 are engaged by the streams and hurled inwardly into pulverizing impingement with other particles moving in various directions, including the direction of movement of the vortex. At the same time the centrifugal action of the vortex, which is many times gravity, tends to drive outwardly the particles of material delivered to the vortex by the feeding mechanism 18, as well as particles which have been carried inwardly by the streams and have not been sufficiently broken up by the disintegrating action.

The result is that there will always be a circulating load of particles moving about the outer region of the chamber and along its peripheral wall to be acted upon by the jets. Some of these particles will be picked up by the streams and moved forwardly and inwardly at varying rates of speed. Others will be hurled violently inwardly by the streams of fluid. The speeds in question will be high and the vortex itself will impart a high speed to the particles moving with it so that particles moving in the direction of the streams and in the direction of the vortex will impinge upon one another at speeds which will fracture or tear the particles and disintegrate them in a very effective manner. The pulverulent particles, thus subjected to repeated impacts, attrition and fracture, will be rapidly reduced in size and eventually reduced to a pulverous condition.

As described in said Andrews Patent 2,032,827, the main pulverizing action is in the turbulent outer portion of the reducing chamber 10 where particles are being thrown continuously against on another at high speeds with great disintegrating effect. At a portion of the chamber disposed radially inwardly of this turbulent outer zone, the direct effect of the streams diminishes to provide a zone wherein the vortex spirals inwardly without the turbulent action which characterizes the outer pulverizing zone. In this inner zone, the material is classified by the centrifugal action of the vortex, substantially all particles greater than predetermined size ranges being returned to the outer region of the vortex.

This classification of material in a zone disposed inwardly of the pulverizing zone results in only the smallest particles being carried over with the fluid through the outlet opening into the collector 24. The vortical movement of the fluid, with its entrained fine particles, continues in the collecting chamber 24 so that the energy of the vortex will be utilized to free the fluid from the pulverous material which it has carried into the collector. The inward component of the vortex is much less in the collector chamber so that a high percentage of the entrained pulverous material is readily separated from the fluid in this chamber by centrifugal action. The separated particles encountering the wall of the collector 24 work along this wall to the restricted opening 26 where they may be collected in a bag or other suitable receptacle. The fluid, substantially free of the entrained particles, moves upwardly through the center of the vortex and thence out through the fluid discharge conduit 27.

As will be noted from the above, the gaseous fluid is introduced, in the form of high velocity jets, into the outer portion of an inwardly spiralling vortex, and in a direction which will maintain the vortex. It will also be noted that the high velocity of the fluid introduced will impart high speeds to the particles of material coming under its influence, and that the speed of rotation of the vortex will be high compared with its component of inward movement. Because of the high speed given to the particles, a violent breaking or tearing effect is exerted thereon as they impinge upon other particles. Under given vortical conditions, the different particles will be disintegrated at a rate which is dependent upon their friability. Because of the high rotative movement of the vortex and the relatively low inward movement of the fluid, the undesirably large particles are returned continuously to the outer portion of the vortex by centrifugal action.

Although the feeding means 18 described above is so arranged as to deliver material through the upper wall of the pulverizing chamber 10 into the outer region of the vortex, material may be supplied to other regions of the vortex, since the centrifugal action of the vortex will cause the coarser particles of freshly supplied material to work outwardly into the active influence of the high velocity streams even though they are supplied to a region which is located relatively inward in the vortex. It is important, however, that the maerial be so supplied to the vortex that the entraining force of the fluid withdrawn from the vortex will not act to entrain the coarse particles and carry them out of the pulverizing chamber. Therefore material may be supplied at the periphery of the chamber 10, or at any inward position which is sufficiently spaced from the fluid withdrawal opening so that the entraining force in this region will not be sufficient to entrain the coarse particles and prevent them from being thrown outwardly in the chamber by centrifugal action.

From what has heretofore been described, it will be understood that circulating load, made up primarily of non-pulverulent particles, or of particles having a specific gravity higher than the entrained particles, circulates in the outer region of the vortex, adjacent the peripheral wall 13 of the chamber 10, during the continuance of the gaseous vortical movement and as long as material which is not entrained immediately is fed into the vortex. The present improvement involves a method and apparatus for discharging all or part of the circulating load from the vortex, preferably at suitable time intervals. The apparatus disclosed herein for thus freeing the vortex of the circulating load of material is in the form of a valved discharge means 30 so positioned as to withdraw material from the outer region of the vortex, that is, to discharge the circulating load carried around by the vortex adjacent the peripheral wall 13.

The discharge means 30 is connected to a discharge opening 31 preferably formed in the upper wall 11, near the periphery of the chamber 10. The discharge opening 31 is normally closed by a valve member 32 secured to the lower end of a valve stem 33 and so formed as to seat upon the edge of the opening 31. The valve member 32 is contained within a valve casing 34 positioned over and connecting with the discharge opening 31 and having a cylindrical member 35 extending upwardly therefrom and a lateral discharge port 36. The valve stem 33 extends upwardly through a gland member 37 in a partition block 38 between the casing 34 and the lower end of the cylinder 35, and a piston 39 on the upper end of the stem 33 reciprocates in the cylinder to thereby move the valve 32 into open and closed positions. The piston 39 is preferably operated by means of compressed air, and the piston and cylinder are so constructed that air pressure on the upper end of the piston serves to move the valve 32 into its closed position, and pressure on the lower end of the piston serves to move the valve into open position.

The opposite ends of the cylinder 35 may be connected to an air compressor or the like through a multiple-port control valve 40 such as shown in detail in Figs. 5, 6 and 7. This valve comprises a valve casing 41 provided with four ports $a$, $b$, $c$ and $d$, port $a$ being connected to a compressor or other source of air pressure, port $b$ being connected to a port $b'$ in the upper end of the cylinder 35, port $c$ being connected to an exhaust, and port $d$ being connected to a port $d'$ in the lower end of the cylinder 35.

Slidably mounted in the valve casing 41 is a valve member 42 provided with a series of passageways which, when the valve is at the limit of its movement in one direction as shown in Fig. 5, serve to connect the compressor through ports $a$ and $b$ to port $b'$ at the upper end of the cylinder 35, the lower end of the cylinder being then connected through port $d'$ with the exhaust port $c$. When the slidable valve 42 is at the other limit of its movement as shown in Fig. 6, the compressor is connected through port $d$ to port $d'$ at the lower end of the cylinder 35, and the upper end of the cylinder is connected through port $b'$ with the exhaust port $c$.

While the slidable valve 42 may be operated manually, it is preferable to operate it automatically and in a certain timed relation with respect to the feeding of material to the chamber 10. This is accomplished in the present apparatus by means of the mechanism illustrated in Figs. 3 and 4, wherein the valve 42 is moved into and held in one position by means of coiled spring 43 having one end anchored to a post 44 on valve casing 41 and the other end secured to the outer end of a lever 45 pivotally supported on an arm 46 hinged on casing 41. The opposite end of lever 45 is pivoted to an extension 47 on valve member 42. As will be apparent, the contractile action of spring 43 will move the valve member to the limit of its movement in one direction as shown in Fig. 5. The movement of valve 42 in this direction is limited by pin 48, and a pin 48' serves to limit its movement in the opposite direction.

The valve member 42 is actuated in the opposite direction by a push rod 49 slidable in a guide bearing 50 and arranged so that one end engages with the extended end 47 of valve member 42 while its opposite end is provided with a cam roller 51 for cooperation with a discharge control cam 52 adjustably secured on the edge of a cam disk 53. The cam disk 53 is secured on the outer end of a shaft 54 which forms part of a speed reducing unit 55. The latter receives its motion from an electric motor 56 through transmission mechanism comprising a driving pulley 57, a belt 58, a pulley 59, speed reducing unit 60, and sprocket chain 61. It will thus be apparent that the slidable valve 42 will be momentarily actuated once during each revolution of cam disk 53 so as to be moved from the extreme limit of its movement in one direction to the extreme limit of its movement in the opposite direction, and will be retained in the latter position during the time that is required for cam 52 to rotate past cam roller 51, whereupon contractile spring 43 will move the valve member in the reverse direction, that is, into its normal position as shown in Fig. 5.

Another cam disk 63 is secured on shaft 54 alongside cam disk 53. Disk 63 is preferably fixed to shaft 54 and disk 53 is rotatably adjustable with respect thereto, such adjustment being effected by means of a bolt and slot arrangement as shown in Fig. 4, wherein bolts 64 passing through arcuate slots 65 in disk 53 and threaded into disk 63 are utilized for securing the two disks against relative rotational movement.

Cam disk 63 has a feed control cam 66 adjustably secured on its edge for cooperation with a cam roller 67 on one end of a lever 68. The lever 68 is pivoted on a bracket 69 and its other end is provided with a roller 70 cooperating with an annular groove 71 in a clutch member 72 splined upon a shaft 73 which forms an extension of the shaft of feed screw 21 heretofore described. Feed screw 21 may be arranged to deliver material from a supply hopper 74 through feed tube 20 to hopper 19 as described above. A cooperating clutch element 75 is formed on a sprocket wheel 76 which is driven by a chain 77 from a sprocket wheel 78 on the outer end of a shaft receiving motion from the speed reducing unit 60. As will be apparent, when the clutch element 72 is brought into cooperative engagement with clutch element 75 by spring 79 the feed screw 21 will be driven from motor 56 but will be inoperative when these clutch elements are out of engagement.

In the operation of the discharge means described above, the material to be pulverized and refined is fed into the reducing chamber 10 for such a period of time as will result in a circulating load of non-pulverulent material around the periphery of the chamber. The time which is necessary to provide such a circulating load will depend, of course, upon the nature of the material being refined. The speed reducing mechanism between the electric motor and the material feed screw 21 can be readily adapted to provide a rate of feed suitable for the type of material operated upon. As will be apparent from the mechanism heretofore described, the operation of the feed screw 21 will be periodically discontinued for a short interval of time when the feed control cam 66 on cam disk 63 comes into engagement with cam roller 67. The feed screw 21 will then remain inoperative until roller 67 drops off the end of the feed control cam 66, whereupon clutch element 72 will again be brought into engagement with clutch element 75 for operation of the feed screw.

The feed control cam 66 and the discharge control cam 52 are so positioned on their respective cam disks and with respect to each other that, while the feed screw 21 is inoperative by reason of the engagement of roller 67 with cam 66, the discharge control cam 52 comes into engagement with cam roller 51 on the end of valve actuating rod 49, whereupon slidable valve member 42 is moved into the position shown in Fig. 6, that is, into a position in which the air compressor is connected to port d' in the lower end of cylinder 35 so as to lift valve 32 from the discharge opening 1. The discharge valve 32 remains in open position while cam roller 51 rides over the discharge control cam 52, and the length of the two cams 52 and 66 is such that roller 51 will drop off cam 52 so as to close the discharge valve slightly before roller 67 drops off cam 66 to place the feed screw in operation. When roller 51 drops off cam 52 the contractile spring 43 moves the valve member 42 into a position whereby pressure in the upper end of the cylinder 35 forces the discharge valve 32 into its closed position. When the discharge valve 32 is in open position, the circulating load of non-pulverous material will be discharged, along with some fluid from the vortex, through the valve casing 34 and outwardly through port 36 and discharge pipe 80 into a bag or other suitable receptacle.

In refining a material, such as clay, in the apparatus described above, the clay is supplied to the reducing chamber 10 and is subjected to the action of the incoming gas streams and the gaseous vortex. Due to the entraining action of the vortex, the reaction of the confining walls of the vortex, and especially the action of the high velocity fluid streams introduced at the periphery of the vortex, a violent interaction is constantly taking place between particles circulating in the vortex, between particles and the confining walls of the vortex, and between particles moving at different speeds and in different directions due to the localized action of the high velocity fluid jets. When the unrefined clay is introduced at a suitable rate, the particles of which it is made up are rapidly reduced in size so as to be entrained in the gas stream moving inwardly to the central outlet. The impurities in the clay, such as pyrites and silica, are reduced at a much slower rate than the clay particles, so that when they reach an inward point in the vortex, the action of centrifugal force upon these larger particles will overcome the entraining action of the gas stream moving toward the central outlet, and the impurities will be returned to the periphery of the vortex, where, by their interactions with the clay particles, they help to reduce the clay particles.

Depending upon the rate at which the unrefined clay is fed to the vortex, the rate of energy input to the vortex, and the percentage of impurities present in the clay, the concentration of impurities in the circulating load adjacent to the periphery of the vortex will gradually increase during the disintegrating operation. If the material is fed at a rate sufficiently low as compared with the energy input to the vortex, all the material, including the impurities, would ultimately be reduced to a particle size permitting entrainment and discharge with the gas at the central outlet, the impurities merely circulating for a longer time than the clay before being reduced sufficiently in particle size to permit such entrainment.

In accordance with the present invention, the unrefined clay is fed at a high rate compared to the energy input to the vortex, so that while the energy input is sufficient to reduce the clay, in the material supplied, to the particle size entrained by the gas stream to the outlet, the impurities accumulate in the circulating load at the periphery of the vortex until the circulating load, consisting mostly of impurities, is as large as can be safely maintained by the rate of energy input to the vortex. Continued operation would result in an increased circulating load, due to further accumulation of impurities, which would cause a decrease in the rate of rotation of the vortex, and a decrease in the centrifugal force acting upon entrained particles, so that larger particles would be entrained by the gas stream to the outlet. Finally, the vortex would be so overloaded that classification would break down completely. The practice of the present invention relieves the vortex of the circulating load before the accumulation of impurities reaches the point where it would reduce the rotation of the vortex sufficiently to allow the entrainment of particles larger than desired in the product.

Although not essential to the invention, it is desirable to start a new cycle of operation, after discharging the circulating load, with a rate of feed substantially higher than the average rate of feed which is most suitable for a certain energy input and a certain particle size in the product. Desired variation in the rate of speed of solid to be refined can readily be accomplished by varying the speed of the screw feeding element 21 in the feed tube 20 supplying material to the hopper 19 and varying the pressure of gas supplied to the injector 22 connected to the lower end of the hopper which serves to discharge the solid under slight pressure through an opening 23 into the treatment chamber. The rate of feed during most of the remainder of the cycle can be the average feed, and for a portion of the cycle at the end, the feed can be interrupted. At the end of the cycle, the circulating load of non-pulverulent solid is cleared, and a new cycle begun. Such a variation in the rate of feed gives a better product and a greater output for a given energy input, and is highly desirable for reasons of economy. As will be apparent, the gaseous vortex is unloaded at the beginning of a cycle of operation. Generally, for practical considerations, it is desirable to keep the rate of energy input to the vortex constant. This rate of energy input on an unloaded vortex causes a very high rate of rotation of the vortex. As feeding is resumed, the material is at first introduced into a substantially unloaded vortex. This results in a very high rate of attrition and may cause undue wear on the confining walls of the vortex chamber, and undesirable reduction of the non-pulverulent solid which it is desired to remove.

To prevent undue wear, and undesirable reduction of the non-pulverulent component in the material supplied, it is sometimes desirable to start the cycle with a rate of feed considerably in excess of the average rate, and continue the high rate until a circulating load comparable to that of average operation is reached. When this average circulating load is reached, it will consist mostly of clay which reduces readily to a size which can be entrained by the inwardly moving fluid and carried to the outlet. The average rate of feed is then maintained for the major part of the cycle, corresponding to the rate of reduction of the clay for the given energy input. During this part of the cycle the concentration of non-pulverulent solid will increase in the circulating load. During the remainder of the cycle, the feed is discontinued, and most of the clay remaining in the circulating load will be reduced and entrained to the outlet. At the end of the cycle, the circulating load, consisting mostly of non-pulverulent particles, which may be impurities, is discharged in the manner heretofore described, and the cycle is then repeated.

As an example illustrating the practice of my invention, German Vallendar clay was refined in a mill constructed substantially in accordance with that illustrated in Figures 1 and 2. The internal diameter of the planar vortex chamber was 15 inches and the depth of the chamber was one and three-sixteenths inches. Eight #18 drill orifices were equispaced around the periphery of the mill tangent to an eight inch diameter theoretical circle concentric with the mill wall. A cylindrical collector barrel six inches in diameter depended from the vortex chamber, set with its walls projecting one-half inch above the floor of the mill, and tapered at its lower end to a one and one-half inch outlet for the solid product. A conical exhaust, disposed concentrically with a collector, extended upwardly from the vortex chamber, terminating in a six inch pipe, with the cone depending one and one-quarter inches into the vortex chamber and having a diameter at its lower end of two and one-half inches. The feed inlet was a one inch pipe set at 20° to the horizontal on a five and one-half inch radius from the center of the vortex chamber. The vent adjacent the periphery of the mill was a three-quarter inch diameter tube.

The clay processed contained between 4 percent and 6 per cent of pyrites and silica and 8 per cent to 10 per cent moisture. The feed was crushed to pass a one-quarter inch screen. The grinding fluid was hot compressed air supplied at a pressure of approximately 100 pounds per square inch gauge at a temperature of 215° Fahrenheit. The free air consumption was thus about 350 cubic feet per minute.

In operation, the air pressure was maintained throughout the entire cycle. The feed was injected into the machine for approximately 55 seconds, then turned off and the mill allowed to run without the introduction of any further material for a period of five seconds. Thereafter, the vent was opened for 2 seconds and the circulating load of impurities discharged. The instantaneous feed rate was approximately 250 pounds per hour. Substantially all (about 95 per cent) of the impurities were retained in the circulating load and vented. The particular size analysis of the product was 3-4 microns average with a screen analysis of a minimum of 99.99 per cent by weight through a 325 mesh screen. The vented material had an average particle size of 20–30 mesh and contained less than 30 per cent by weight of desired clay particles.

As an alternative procedure, illustrating another phase of my invention, clay material was supplied to a vortex created as above outlined at the rate of three pounds in the first 15 seconds of the feeding period and then at the rate of one pound for each 10 seconds over a period of 45 seconds. The feed was then interrupted for 5 seconds, the circulating load of impurities discharged in 2 seconds, and the cycle repeated.

While a preferred method for practising the invention has been disclosed herein, together with a preferred form of apparatus, it is to be understood that the invention is not intended to be limited to the precise method and apparatus disclosed. The above description and the accompanying drawings are therefore to be regarded as illustrative only, and it is to be understood that the invention is susceptible of other forms and arrangements so long as they come within the scope of the appended claims.

This application is a continuation of my prior application Serial 348,733, filed July 31, 1940.

I claim:

1. The method of pulverizing and separating a frangible material from a partially comminuted mixture of said frangible material and a less frangible material comprising: introducing a gas into a chamber near the periphery thereof and causing same to create a reentrant circulatory path; venting said gas from a point inwardly of said circulatory path; introducing said mixed material into said chamber in the region of said circulatory path; regulating the speed of said circulatory gas to hold the less frangible particles near the periphery of said chamber by their centrifugal force while the frangible particles are pulverized and pass out from said chamber with said gas being vented; continuing said action until substantially all of the frangible material has been pulverized and removed from said chamber, without pulverizing and similarly removing any substantial amount of the less frangible material; then terminating the raw feed into said chamber and substantially concurrently therewith venting the material near the periphery of said chamber therefrom, by which to withdraw from said chamber material remaining therein, then being substantially the less frangible portion of said mixture and especially the larger particles thereof; then terminating said venting and substantially concurrently readmitting said raw feed; and, repeating the cycle.

2. Apparatus for pulverizing and separating a frangible material from a partially comminuted mixture of said frangible material and a less frangible material, comprising: a chamber; a plurality of jets of high pressure gas entering said chamber tangentially to a theoretical circle within said chamber and producing a high-speed, reentrant, circulatory zone of gas travel within said chamber; outlet means located centrally of said theoretical circle for venting said gas; means including a worm driven through a normally engaged clutch feeding said mixture into said chamber; outlet means through the wall of said chamber at a point remote from the center of said theoretical circle and an outlet valve normally closing said outlet; means including a piston and cylinder controllably opening and closing said outlet valve; a working gas introduced into and exhausted from said cylinder through a control valve; a pair of rotating cams and means causing same to rotate at a selected speed; means periodically moved by one cam disengaging said worm; means periodically moved by the other cam operating said control valve and thereby causing said outlet valve to open; other means restoring said clutch and control valve to normal position when said cams have passed operating position; said cams operating at such a speed with respect to each other and to the rate of pulverization of the frangible material that said cams will operate approximately simultaneously when the relatively frangible portion of the mixture within said chamber is substantially pulverized and the less frangible portion is still substantially unpulverized.

3. Apparatus for pulverizing and separating a frangible material from a partially comminuted mixture of said frangible material and a less frangible material, comprising: a chamber; a plurality of jets introducing a high-pressure gas into said chamber tangentially to a theoretical circle therein; outlet means located centrally of said circle providing escape for said gas; means introducing said mixture as raw feed into said chamber; an opening in the periphery of said chamber and a valve normally closing said opening; a pair of constant speed cams and means operatively connecting one cam to means terminating said raw feed and means operatively connecting the other cam to means opening said valve; means driving said cams at such speed with respect to the time required to pulverize said materials that said valve will open after said frangible material is substantially pulverized but before any appreciable amount of said less frangible material is pulverized and said raw feed means will be inoperative for substantially the period that said valve is open.

4. Apparatus for pulverizing and separating a frangible material from a partially comminuted mixture of said material and a less frangible material, comprising: a chamber; means circulating a gas at high velocity within said chamber; outlet means for said gas located centrally of said chamber; other outlet means through a wall of said chamber and valve means holding same normally closed; feed means introducing said mixture into said chamber and stopping means therefor; timed means periodically opening said valve means and substantially simultaneously stopping said feed, holding same a selected period and then permitting said valve means to reclose and said feed to resume.

NORWOOD H. ANDREWS.